(12) United States Patent
Yoshizawa (10) Patent No.: US 8,295,642 B2
(45) Date of Patent: Oct. 23, 2012

(54) IMAGE PROCESSING APPARATUS, IMAGE PROCESSING METHOD, AND COMPUTER PROGRAM PRODUCT

(75) Inventor: Fumio Yoshizawa, Chiba (JP)

(73) Assignee: Ricoh Company Limited, Tokyo (JP)

( * ) Notice: Subject to any disclaimer, the term of this patent is extended or adjusted under 35 U.S.C. 154(b) by 876 days.

(21) Appl. No.: 12/415,216

(22) Filed: Mar. 31, 2009

(65) Prior Publication Data

US 2009/0268258 A1 Oct. 29, 2009

(30) Foreign Application Priority Data

Apr. 25, 2008 (JP) .................. 2008-115238

(51) Int. Cl.
*G06K 9/36* (2006.01)
*H04N 1/04* (2006.01)

(52) U.S. Cl. ...................... 382/289; 358/488
(58) Field of Classification Search .......... 382/289, 382/295, 296, 312, 317, 318, 304; 358/474, 358/488

See application file for complete search history.

(56) References Cited

U.S. PATENT DOCUMENTS

| 4,985,930 | A | * | 1/1991 | Takeda et al. | 382/306 |
| 5,430,550 | A | * | 7/1995 | Hashimoto et al. | 358/488 |
| 6,466,340 | B1 | * | 10/2002 | Washio | 358/488 |
| 6,750,989 | B1 | * | 6/2004 | Kamada et al. | 358/488 |
| 7,237,866 | B2 | * | 7/2007 | Yamazaki et al. | 347/21 |
| 7,391,543 | B2 | * | 6/2008 | Ohara | 358/483 |
| 7,690,745 | B2 | * | 4/2010 | Ouchi | 347/14 |
| 7,880,940 | B2 | * | 2/2011 | Nakagawa | 358/474 |

FOREIGN PATENT DOCUMENTS

| JP | 7-262312 | 10/1995 |
| JP | 11-298682 | 10/1999 |
| JP | 2001-358914 | 12/2001 |

* cited by examiner

*Primary Examiner* — Kanjibhai Patel
(74) *Attorney, Agent, or Firm* — Oblon, Spivak, McClelland, Maier & Neustadt, L.L.P.

(57) ABSTRACT

A first line sensor optically reads a first surface of an original in a main scanning direction to obtain first line image data. A second line sensor arranged in parallel to the first line sensor at a predetermined distance optically reads a second surface of the original to obtain second line image data. A tilt detecting unit detects main-scanning coordinates of a first edge and a second edge from the first line image data, detects main-scanning coordinates of a third edge and a fourth edge from the second line image data, and detects a tilt of the original with respect to a sub-scanning direction based on the detected main-scanning coordinates.

9 Claims, 11 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-115238 filed in Japan on Apr. 25, 2008.

BACKGROUND OF THE INVENTION

1. Field of the Invention

The present invention relates to a technology for detecting a tilt of an original in a sheet-through type reading device in an image processing apparatus.

2. Description of the Related Art

An image reading device mounted on a scanner, a facsimile, or a digital multifunction peripheral is generally configured as either a flat head type or a sheet through type depending on a method of reading an original. Specifically, the flat head type image reading device scans an entire original by moving a line sensor while the original is placed at a fixed position. On the other hand, the sheet through type image reading device scans an entire original by moving the original while a line sensor is placed at a fixed position. Recently, a sheet-through type image reading device provided with a line sensor for reading a front surface of an original and a line sensor for reading a back surface of the original on a conveying path of the original is becoming popular. However, the sheet-through type image reading device reads an original by moving the original, so that the original is more likely to tilt with respect to a reading direction while the original is read compared to when the flat head type image reading device is used.

With regard to a tilt of an original in the sheet-through type image reading device, Japanese Patent Application Laid-open No. H11-298682 discloses a technology for detecting a tilt of an original by using a dedicated sensor. Specifically, the dedicated sensor that detects an edge of the original is provided on a conveying path of the original with respect to each size of the original. Furthermore, Japanese Patent Application Laid-open No. H7-262312 discloses a technology for detecting a tilt of an original based on a connectivity of black pixels contained in the original that has been read.

However, in the former technology, the dedicated sensor that detects the edge of the original needs to be mounted on the image reading device in addition to a line sensor that reads the original. Therefore, the size of the image reading device and costs for hardware increase.

In the latter technology, an image recognition process is necessary. Therefore, when the image recognition process is performed by software, a processing time increases, and when the image recognition process is performed by hardware, a large-scale and complicated circuit is necessary. Furthermore, when a character line printed on the original is initially tilted with respect to each side of the original, a tilt of the original cannot be accurately detected.

SUMMARY OF THE INVENTION

It is an object of the present invention to at least partially solve the problems in the conventional technology.

According to one aspect of the present invention, there is provided an image processing apparatus including a first line sensor that is arranged in a main-scanning direction and optically reads a first surface of an original, to obtain first line image data; a second line sensor that is arranged in parallel to the first line sensor at a predetermined distance and optically reads a second surface of the original, to obtain second line image data; and a tilt detecting unit that detects a first main-scanning coordinate of a first edge and a second main-scanning coordinate of a second edge from the first line image data, detects a third main-scanning coordinate of a third edge and a fourth main-scanning coordinate of a fourth edge from the second line image data, and detects a tilt of the original with respect to a sub-scanning direction based on detected main-scanning coordinates.

Furthermore, according to another aspect of the present invention, there is provide an image processing method including first reading including a first line sensor arranged in a main-scanning direction optically reading a first surface of an original to obtain first line image data; second reading including a second line sensor arranged in parallel to the first line sensor at a predetermined distance optically reading a second surface of the original to obtain second line image data; and tilt detecting including detecting a first main-scanning coordinate of a first edge and a second main-scanning coordinate of a second edge from the first line image data, detecting a third main-scanning coordinate of a third edge and a fourth main-scanning coordinate of a fourth edge from the second line image data, and detecting a tilt of the original with respect to a sub-scanning direction based on detected main-scanning coordinates.

Moreover, according to still another aspect of the present invention, there is provided a computer program product including a computer usable medium having computer readable program codes embodied in the medium. The program codes when executed cause a computer to execute first reading including a first line sensor arranged in a main-scanning direction optically reading a first surface of an original to obtain first line image data; second reading including a second line sensor arranged in parallel to the first line sensor at a predetermined distance optically reading a second surface of the original to obtain second line image data; and tilt detecting including detecting a first main-scanning coordinate of a first edge and a second main-scanning coordinate of a second edge from the first line image data, detecting a third main-scanning coordinate of a third edge and a fourth main-scanning coordinate of a fourth edge from the second line image data, and detecting a tilt of the original with respect to a sub-scanning direction based on detected main-scanning coordinates.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the following embodiments. The accompanying drawings are merely schematic diagrams, and an actual size or an actual ratio between components are not taken into consideration in the drawings. Furthermore, a size or a ratio of the same component is not uniform in the drawings.

Figure 1:
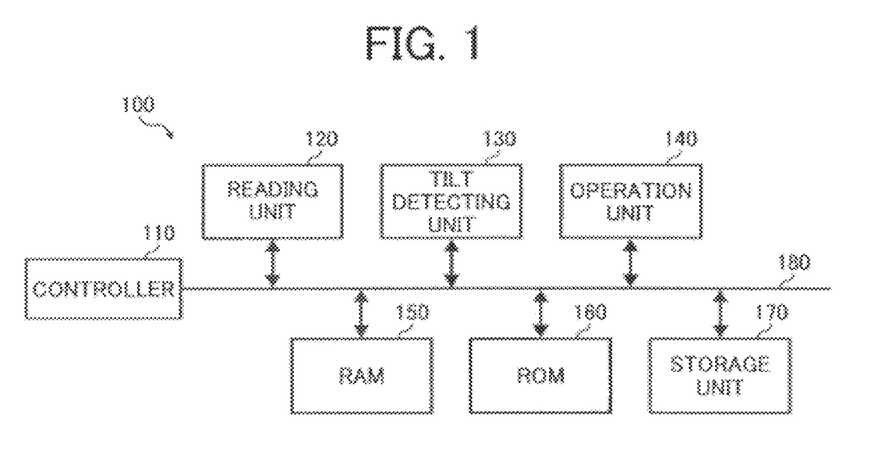
FIG. 1 is a functional block diagram of an image processing apparatus according to an embodiment of the present invention.

FIG. 1 is a functional block diagram of an image processing apparatus 100 according to an embodiment of the present invention. The image processing apparatus 100 includes a controller 110, a reading unit 120, a tilt detecting unit 130, an operation unit 140, a random access memory (RAM) 150, a read only memory (ROM) 160, and a storage unit 170, which are connected to one another via an internal bus 180.

The controller 110 functions as a processor that controls operations of the reading unit 120, the tilt detecting unit 130, and the operation unit 140.

The reading unit 120 refers to read-setting information that is stored in the RAM 150 through a process to be described later, and optically reads both surfaces of an original at the same time based on the read-setting information. The reading unit 120 includes a first line sensor 121 that reads a front surface of an original and a second line sensor 122 that reads a back surface of the same original. The first line sensor 121 and the second line sensor 122 are arranged at fixed positions. The reading unit 120 conveys an original in a direction (hereinafter, referred to as either "conveying direction" or "sub-scanning direction" as appropriate) perpendicular to a longitudinal direction of the first line sensor 121 and the second line sensor 122 (hereinafter, "main-scanning direction"), thereby reading the original. Each of the first line sensor 121 and the second line sensor 122 can be a known sensor such as a charge coupled device (CCD) or a contact image sensor (CIS).

Figure 2:
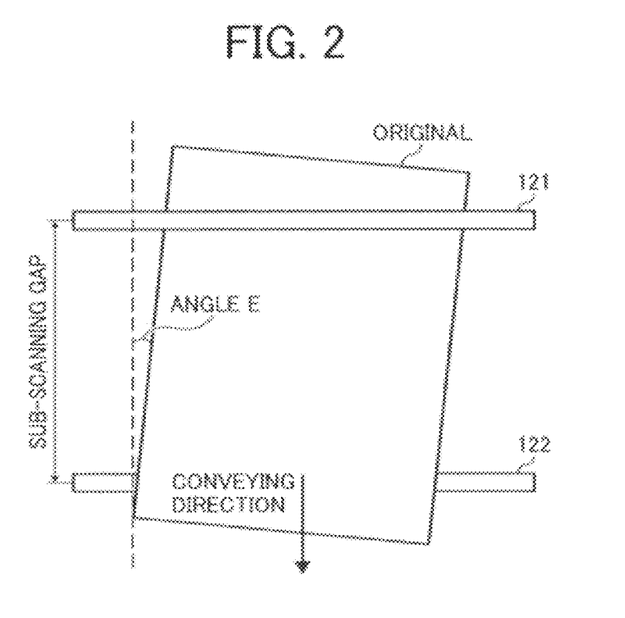
FIG. 2 is a schematic diagram of an example of an arrangement of a first line sensor and a second line sensor in a reading unit shown in FIG. 1.
Figure 6:
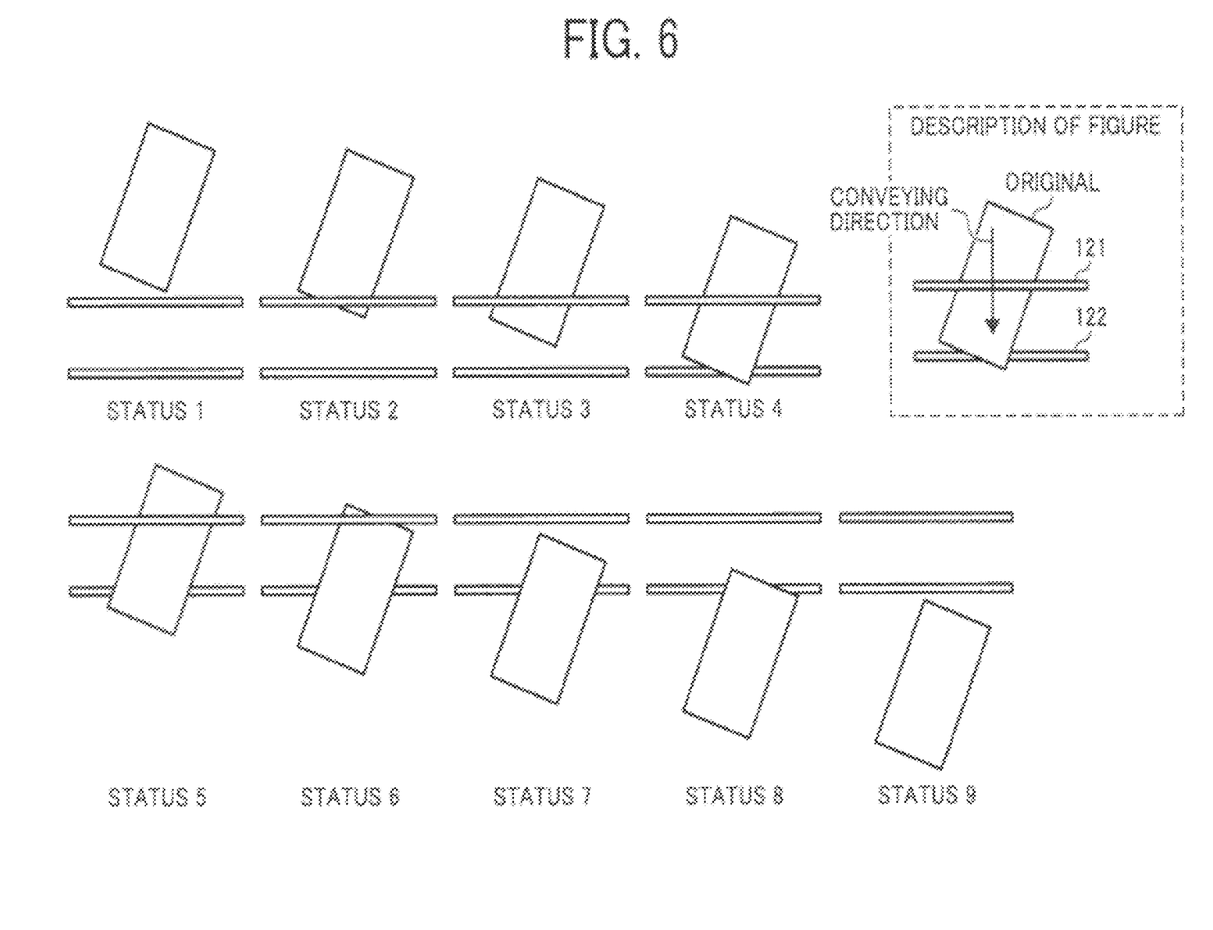
FIG. 6 is a schematic diagram illustrating conveying states of an original in temporal sequence when the original is read.

FIG. 2 is a schematic diagram of an example of an arrangement of the first line sensor 121 and the second line sensor 122 in the reading unit 120. The first line sensor 121 and the second line sensor 122 are arranged in parallel such that a predetermined distance (hereinafter, "sub-scanning gap") is maintained between the first line sensor 121 and the second line sensor 122 along the conveying direction of an original. The sub-scanning gap needs to be set shorter than at least one side of an original depending on the size of the original to be read so that the original can be put in a state 5, which will be described later, while the original is conveyed. This is because, if the sub-scanning gap is set longer than each side of the original to be read, the original cannot be put in the state 5, whereby four edges, which will be described later, cannot be detected. When the sub-scanning gap is increased by not more than one side of the original, a tilt of the original can be more precisely detected. However, when the sub-scanning gap is increased, a difference between a time taken from a start of conveying the original to a completion of reading the front surface of the original and a time taken from a start of conveying the original to a completion of reading the back surface of the original increases. Therefore, it is applicable to set the sub-scanning gap as appropriate in consideration of a balance between detection precision of the tilt and a time taken for reading the both surfaces of the original.

When the original is conveyed to a position facing to the first line sensor 121, a light emitted from a front-surface light source (not shown) towards the front surface of the original is reflected by the front surface, and then the first line sensor 121 receives the reflected light. Similarly, when the original is conveyed to a position facing to the second line sensor 122, a light emitted from a back-surface light source (not shown) towards the back surface of the original is reflected by the back surface, and then the second line sensor 122 receives the reflected light.

The reading unit 120 converts the intensity of the light received by each of the first line sensor 121 and the second line sensor 122 into an analog electrical signal, and then converts the electrical signal into digital tone data for each reading line (hereinafter, "line image data") through quantization. The reading unit 120 then stores the line image data in the RAM 150. Here, the reading line indicates an area to be read by each of the first line sensor 121 and the second line sensor 122 at one time. By accumulating the line image data generated for each of the reading lines by each of the first line sensor 121 and the second line sensor 122, both-surfaces image data of one original can be obtained. The both-surfaces image data is constituted of front-surface image data of the entire front surface of the original and back-surface image data of the entire back surface of the original.

When reading an original, the reading unit 120 simultaneously obtains front-surface line image data that corresponds to a reading line read by the first line sensor 121 (hereinafter, "front-surface reading line"), and back-surface line image data that corresponds to a reading line read by the second line sensor 122 (hereinafter, "back-surface reading line") at the same time when the first line sensor 121 reads the front-surface reading line.

The tilt detecting unit 130 detects a tilt of the original based on the front-surface line image data and the back-surface line image data received from the reading unit 120. The original should ideally be maintained perpendicular to each of the first line sensor 121 and the second line sensor 122 while the original is conveyed. However, the original may be tilted by an angle E with respect to the conveying direction when the original is actually conveyed. The tilt detecting unit 130 is configured to detect the angle E. The tilt detecting unit 130 sequentially stores pieces of the line image data received from the reading unit 120 in the storage unit 170.

Figure 3:
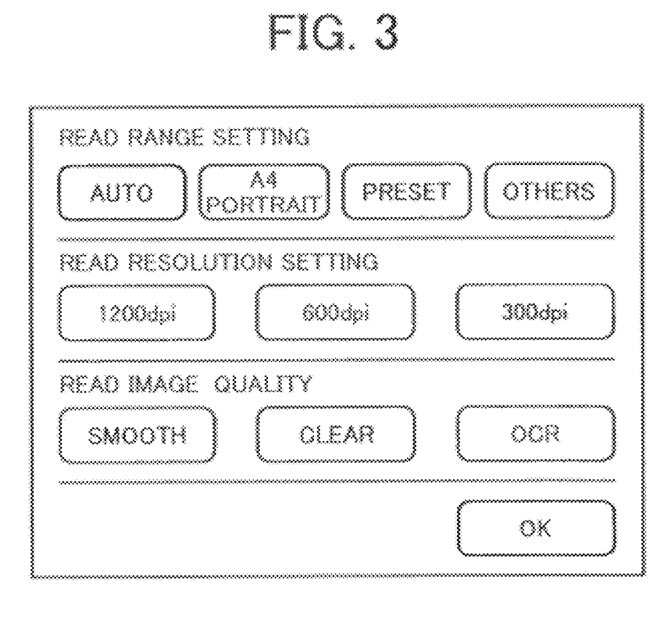
FIG. 3 is a schematic diagram of an example of contents displayed on an operation unit shown in FIG. 1.

The operation unit 140 includes a touch-panel screen such as a liquid crystal panel, receives an input of various read-setting information necessary for using the image processing apparatus 100 from a user, and displays the received read-setting information and other information on the screen. FIG. 3 is a schematic diagram of an example of contents displayed on the operation unit 140. In this example, keys for specifying a read range, keys for specifying read resolution, keys for specifying read image quality, and a confirmation button ("OK" in the drawing) are displayed on the screen. When a user inputs the read-setting information via the keys and then touches the confirmation button, the operation unit 140 stores the input contents in the RAM 150. The configuration of the operation unit 140 is not limited to this example. For example, the operation unit 140 can include, as a unit for receiving an input of the read-setting information, hardware buttons that are to be pressed by a user for selecting settings.

The RAM 150 is a memory for storing therein information to be used for performing processes by the reading unit 120, the tilt detecting unit 130, and the operation unit 140.

The ROM 160 is a memory for storing therein control programs or master data to be used for performing processes by the reading unit 120, the tilt detecting unit 130, and the operation unit 140.

In the storage unit 170, the line image data of the original is accumulated, so that the storage unit 170 stores therein the both-surfaces image data of the original, which is constituted of the front-surface image data and the back-surface image data. The storage unit 170 also stores therein the angle E.

Figure 4:
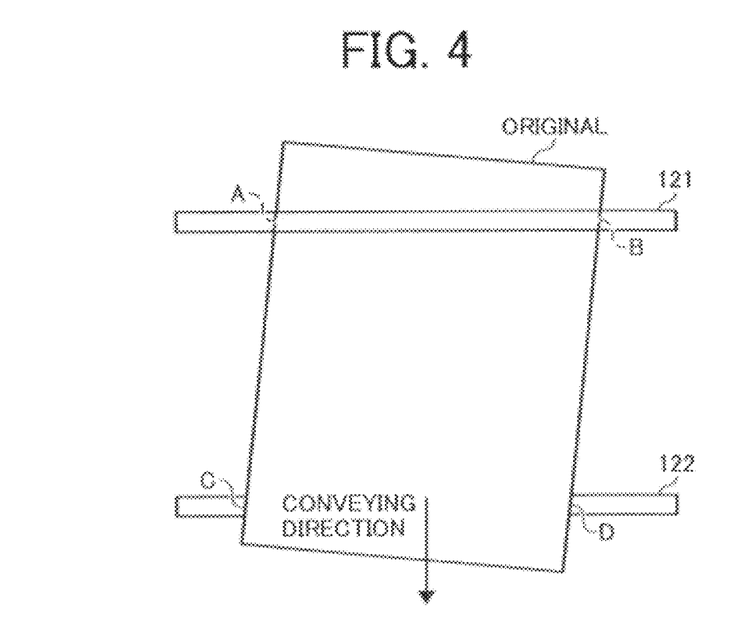
FIG. 4 is a schematic diagram for explaining reference names of edges of an original according to the embodiment.

An operation by the tilt detecting unit 130 is described in detail below with reference to FIGS. 4 to 11. The tilt detecting unit 130 reads the front-surface line image data and the back-surface line image data stored in the RAM 150, which have been sequentially stored by the reading unit 120, and detects a portion corresponding to an edge of the original (hereinafter, "edge") from each of the front-surface line image data and the back-surface line image data. FIG. 4 is a schematic diagram for explaining reference names of the edges of the original for convenience of explanation in the description. Among two edges of the original read by the first line sensor 121, an edge on the left side in FIG. 4 (on a small coordinate side, which will be described later) is referred to as an edge A, and an edge on the right side in FIG. 4 (on a large coordinate side, which will be described later) is referred to as an edge B. Similarly, among two edges of the original read by the second line sensor 122, an edge on the left side in FIG. 4 (i.e., an edge on an extended line of the edge A) is referred to as an edge C, and an edge on the right side in FIG. 4 (i.e., an edge on an extended line of the edge B) is referred to as an edge D. While it is assumed in the example shown in FIG. 4 that the original is portrait-oriented along the conveying direction, the same configuration is applicable to an original that is landscape-oriented along the conveying direction.

Figure 5:
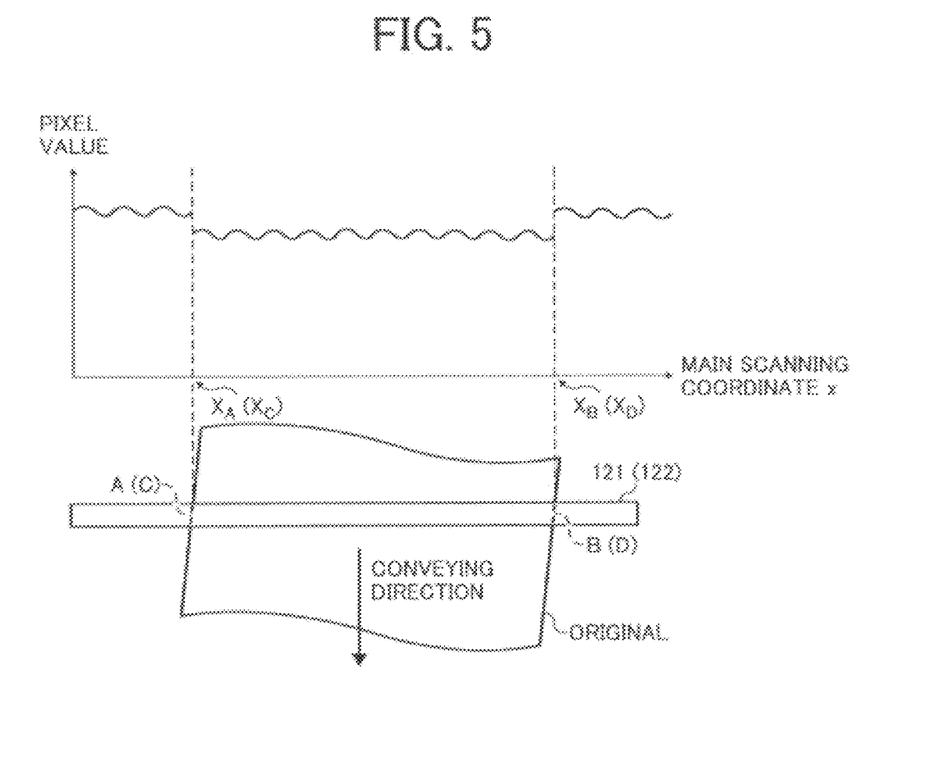
FIG. 5 is a schematic diagram for explaining pixel values of front-surface line image data and back-surface line image data with respect to a main-scanning coordinate.

FIG. 5 is a schematic diagram for explaining pixel values of the front-surface line image data and the back-surface line image data with respect to a main-scanning coordinate. The main-scanning coordinate indicates a position on each of the first line sensor 121 and the second line sensor 122 in the main-scanning direction when a left end of each of the first line sensor 121 and the second line sensor 122 in FIG. 5 is assumed to be zero. In the embodiment, the main-scanning direction is referred to as an x-axis direction and xA indicates a coordinate of the edge A in the x-axis direction (the main-scanning coordinate).

In the state shown in FIG. 5, in an area of the main-scanning coordinates corresponding to an area where the original is not present, predetermined surfaces of the original conveying paths that face the first line sensor 121 and the second line sensor 122, respectively, that is, predetermined surfaces that face the first line sensor 121 and the second line sensor 122 with the front surface and the back surface of the original in between, are read. Therefore, constant pixel values are obtained in the above-mentioned area. The predetermined surfaces are configured to have a color with a uniform density that can be clearly distinguished form a density of a background of the original.

In the embodiment, it is assumed that the predetermined surfaces have a color with a density lower than that of the background of the original. In the example shown in FIG. 5, pixel values in an area between the main-scanning coordinate xA of the edge A and a main-scanning coordinate xB of the edge B, and an area between a main-scanning coordinate xC of the edge C and a main-scanning coordinate xD of the edge D are smaller than those of the background of the original. In other words, as shown in FIG. 5, the pixel values of the main-scanning coordinates discontinue at the edges of the original. Thus, by using such a discontinuous pattern and a known technique such as a pattern matching method, the edges A, B, C, and D and the main-scanning coordinates xA, xB, xC, and xD can be detected.

Figure 7:
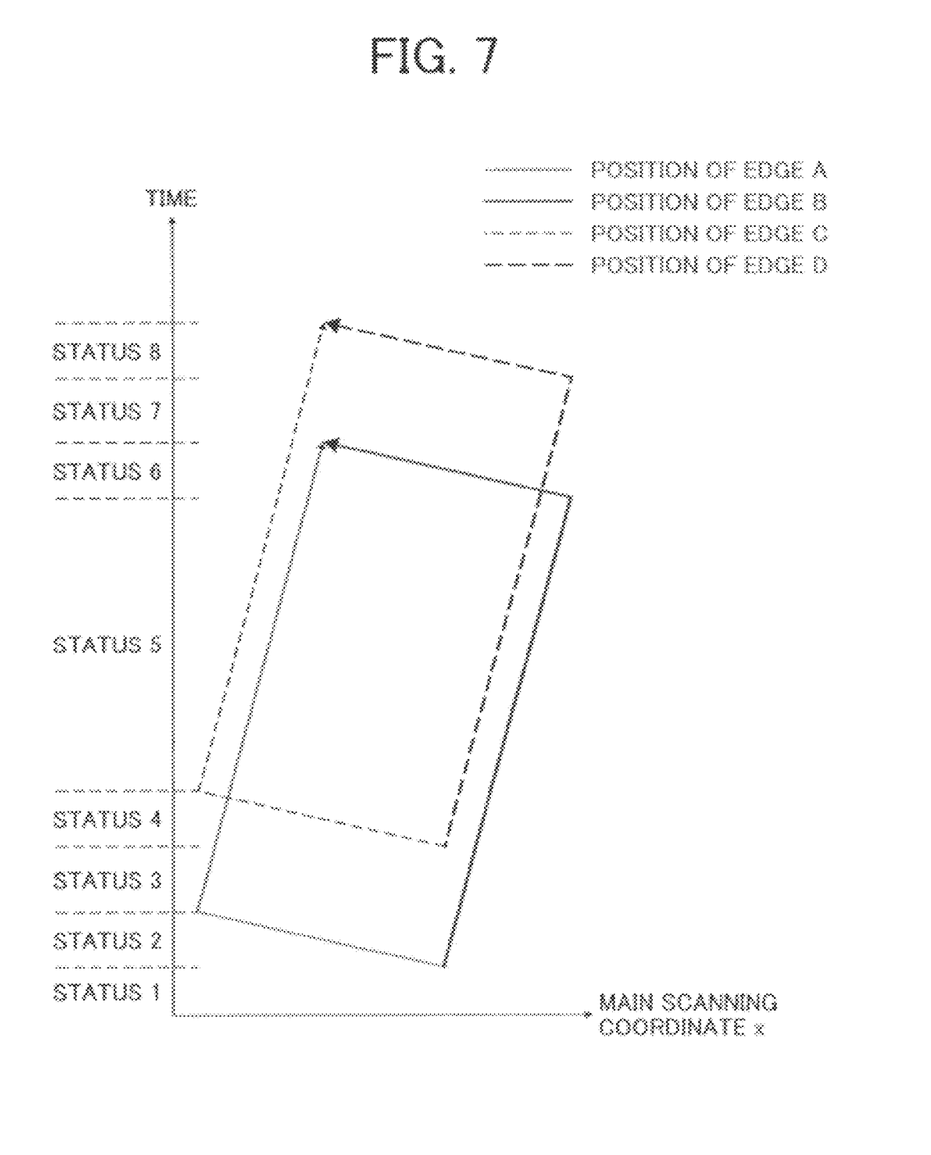
FIG. 7 is a schematic diagram illustrating changes in coordinates of edges A, B, C, and D with respect to conveying times (states 1 to 9)
Figure 8:
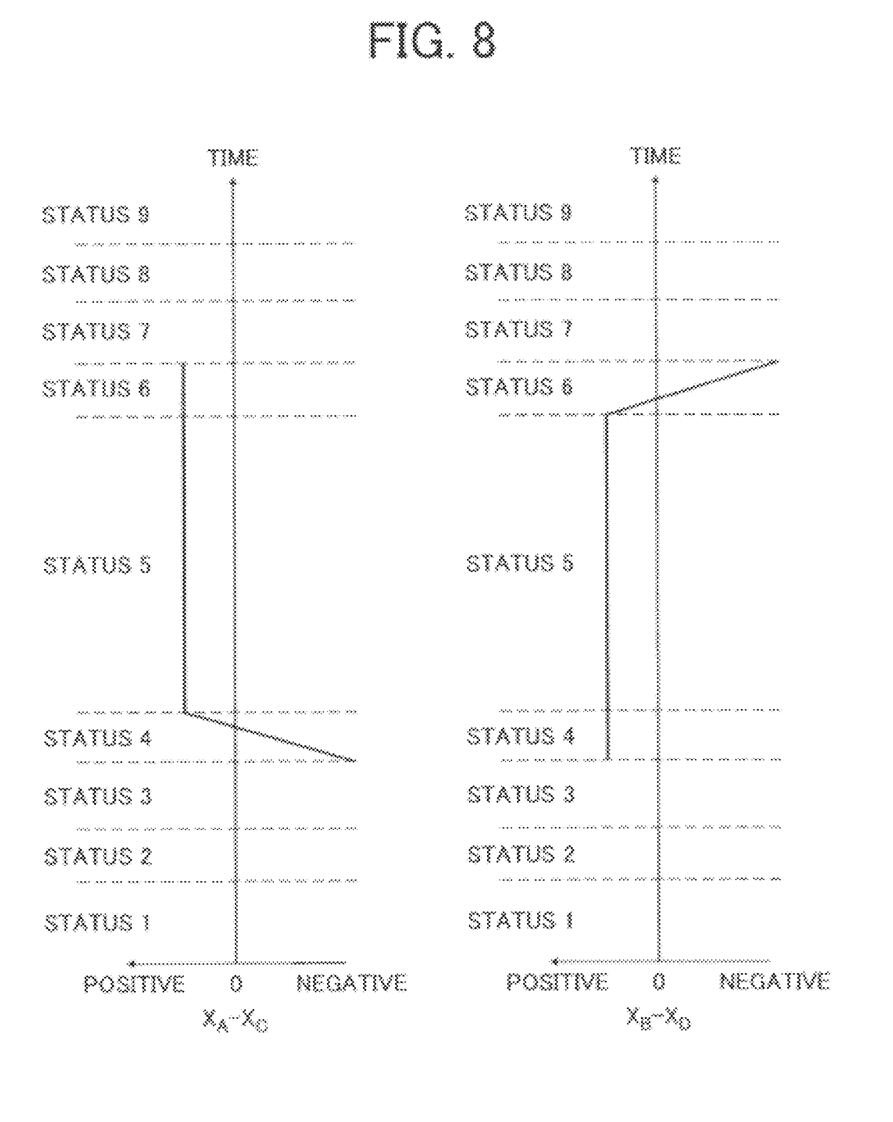
FIG. 8 is a schematic diagram illustrating changes in values of a difference between a main-scanning coordinate xA of the edge A and a main-scanning coordinate xC of the edge C, and a difference between a main-scanning coordinate xB of the edge B and a main-scanning coordinate xD of the edge D, with respect to conveying times.

FIG. 6 is a schematic diagram illustrating conveying states of an original in temporal sequence when the original is read. In the following description, the conveying time taken for reading one original is divided into nine states, that is, states 1 to 9. FIG. 7 is a schematic diagram illustrating changes in coordinates of the edges A, B, C, and D with respect to the conveying times (the states 1 to 9). FIG. 8 is a schematic diagram illustrating changes in values of a difference between the main-scanning coordinate xA of the edge A and the main-scanning coordinate xC of the edge C, and a difference between the main-scanning coordinate xB of the edge B and the main-scanning coordinate xD of the edge D, with respect to conveying times. Hereinafter, the differences are referred to as main-scanning gaps.

The tilt detecting unit 130 detects edges of each of the front-surface line image data and the back-surface line image data that are read at the same time (hereinafter, the front-surface line image data and the back-surface line image data are collectively referred to as "both-surfaces line image data"). When detecting four edges from the both-surfaces line image data, the tilt detecting unit 130 calculates a main-scanning gap xA−xC on the small coordinate side and a main-scanning gap xB−xD on the large coordinate side from among the main-scanning coordinates xA, xB, xC, and xD of the detected edges A, B, C, and D.

The tilt detecting unit 130 determines whether the calculated main-scanning gaps xA−xC and xB−xD are obtained by reading the original in the state 5, that is, whether these main-scanning gaps are data available for calculating the angle E indicating a tilt of the original. The state 5 is, as shown in FIG. 6, a state in which both corners on the leading end of the original have passed the second line sensor 122 and both corners on the trailing end of the original have not passed the first line sensor 121. When the original is in the state 5, the four edges A, B, C, and D to be detected are on two parallel sides of the original with no exception. Therefore, the tilt of the original can be precisely detected.

The above determination can be made by determining whether a difference between the main-scanning gap xA−xC on the small coordinate side and the main-scanning gap xB−xD on the large coordinate side is within a predetermined range. If the difference is within the predetermined range, it is determined that the main-scanning gaps are obtained by reading the original in the state 5. On the other hand, if the difference is not within the predetermined range, it is determined that the main-scanning gaps are obtained by reading the original in the states other than the state 5. This is because the shape of the original is generally rectangle, when the original is put in the state 5, the main-scanning gap xA−xC and the main-scanning gap xB−xD become substantially the same.

After reading of the original is completed (the state 9), a representative value is obtained for each of the main-scanning gaps that have been determined that they are read from the original in the state 5. While it is assumed in the embodiment that the edges are detected for each reading line, the number of samples and intervals for detecting the edges is not limited to this example. As the number of the main-scanning gaps obtained from the original in the state 5 increases, the detection precision of the tilt of the original improves. Even when the number of the main-scanning gaps obtained from the original in the state 5 decreases, if a temporal interval between a plurality of reading times for reading the original in the state 5 increases (an interval in the sub-scanning direction increases), the detection precision of the tilt of the original improves.

Figure 9:
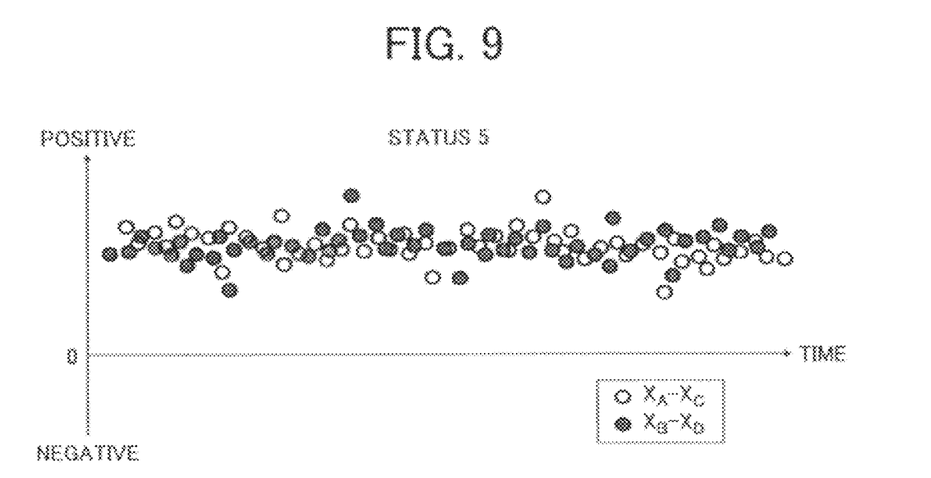
FIG. 9 is a schematic diagram illustrating values of main-scanning gaps that are calculated by reading an original in the state 5.

FIG. 9 is a schematic diagram illustrating values of the main-scanning gaps that are calculated by reading the original in the state 5. If the original is rectangle, the values should ideally be aligned. In the actual situation, however, the values slightly fluctuate as shown in FIG. 9 due to a read error or an edge detection error by the line sensor.

The representative value of the main-scanning gaps can be obtained through calculation of an average or approximation by a least square method with respect to the values of the main-scanning gaps read from the original in the state 5. The calculation of an average is advantageous in that it can be performed by a simple operation in a short time without using specific software while only a compact circuit is sufficient as hardware. On the other hand, the approximation by the least square method is advantageous in that a more precise value than that obtained by the calculation of the average can be obtained although more complicated operation is necessary.

Figure 10:
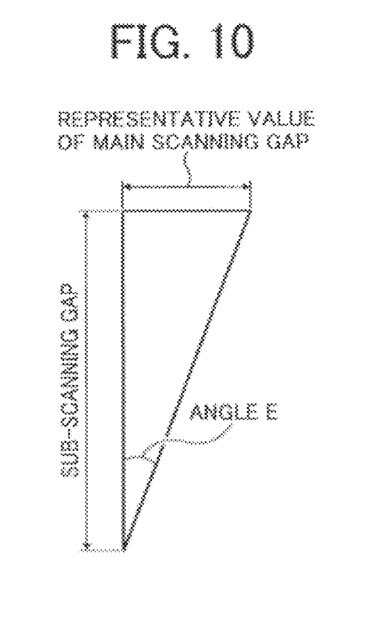
FIG. 10 is a schematic diagram illustrating a relationship among an angle E indicating a tilt of an original, a representative value of the main-scanning gap, and a sub-scanning gap.

The tilt detecting unit 130 obtains the angle E indicating the tilt of the original based on the obtained representative value of the main-scanning gaps, and the sub-scanning gap. FIG. 10 is a schematic diagram illustrating a relationship among the angle E indicating the tilt of the original, the representative value of the main-scanning gaps, and the sub-scanning gap. In FIG. 10, relational expression "tan E=(the representative value of the main-scanning gaps)/(the sub-scanning gap)" is obtained, so that the angle E is obtained by the relational expression.

Figure 11A:
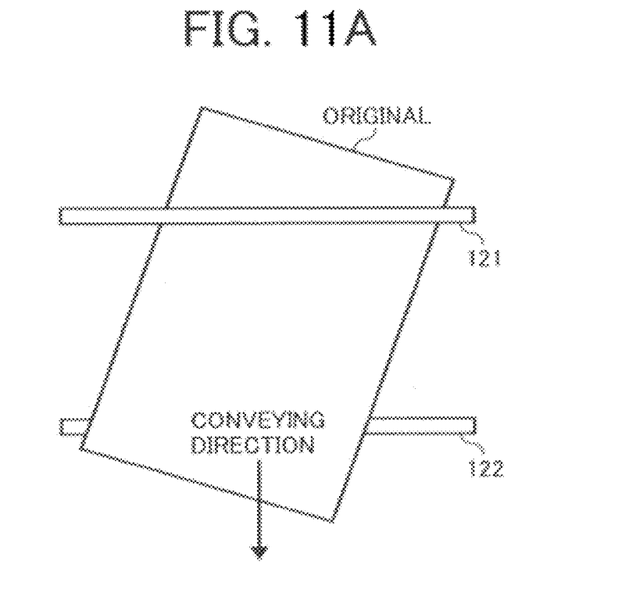
FIG. 11A is a schematic diagram illustrating a state where an original is conveyed with a corner on a large coordinate side at the head.
Figure 11B:
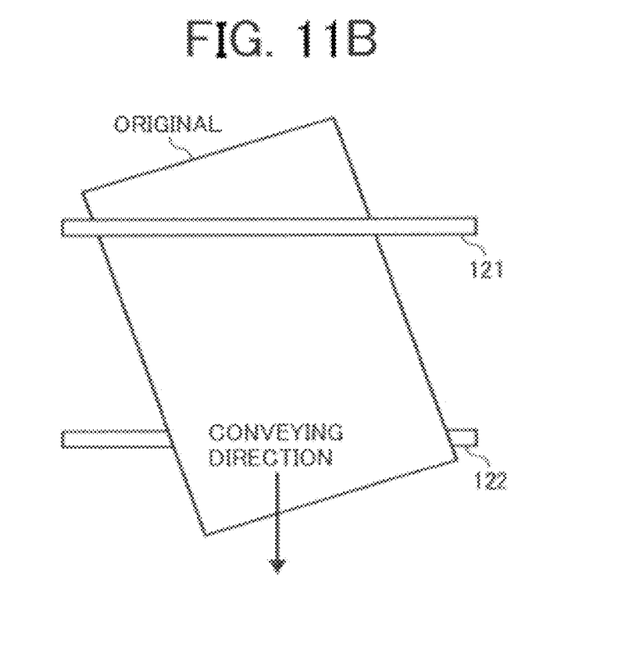
FIG. 11B is a schematic diagram illustrating a state where an original is conveyed with a corner on a small coordinate side at the head.

FIG. 11A is a schematic diagram illustrating a state where the original is conveyed with a corner on the large coordinate side at the head. FIG. 11B is a schematic diagram illustrating a state where the original is conveyed with a corner on the small coordinate side at the head. In the embodiment, the angle E to be calculated becomes a positive value in the former example (FIG. 11A), and becomes a negative value in the latter example (FIG. 11B).

The tilt detecting unit 130 stores the angle E indicating the tilt of the original in the storage unit 170 in association with the entire original, that is, the both-surfaces image data of the both surfaces of the original. When the operation unit 140 reads the angle E stored in the storage unit 170 and displays the angle E on the screen described above, a user can recognize that the original is tilted while the original is read. It is applicable to configure the image processing apparatus 100 to include a tilt correcting unit that reads the angle E and the both-surfaces image data from the storage unit 170 and corrects the tilt of the both-surfaces image data based on the angle E through a known skew-correction process. Furthermore, similar to a modified configuration to be explained later, it is applicable to have a configuration in which the angle E and the both-surfaces image data are read from the storage unit 170 and then sent to another apparatus via a network so that the another apparatus corrects the tilt.

Figure 12:
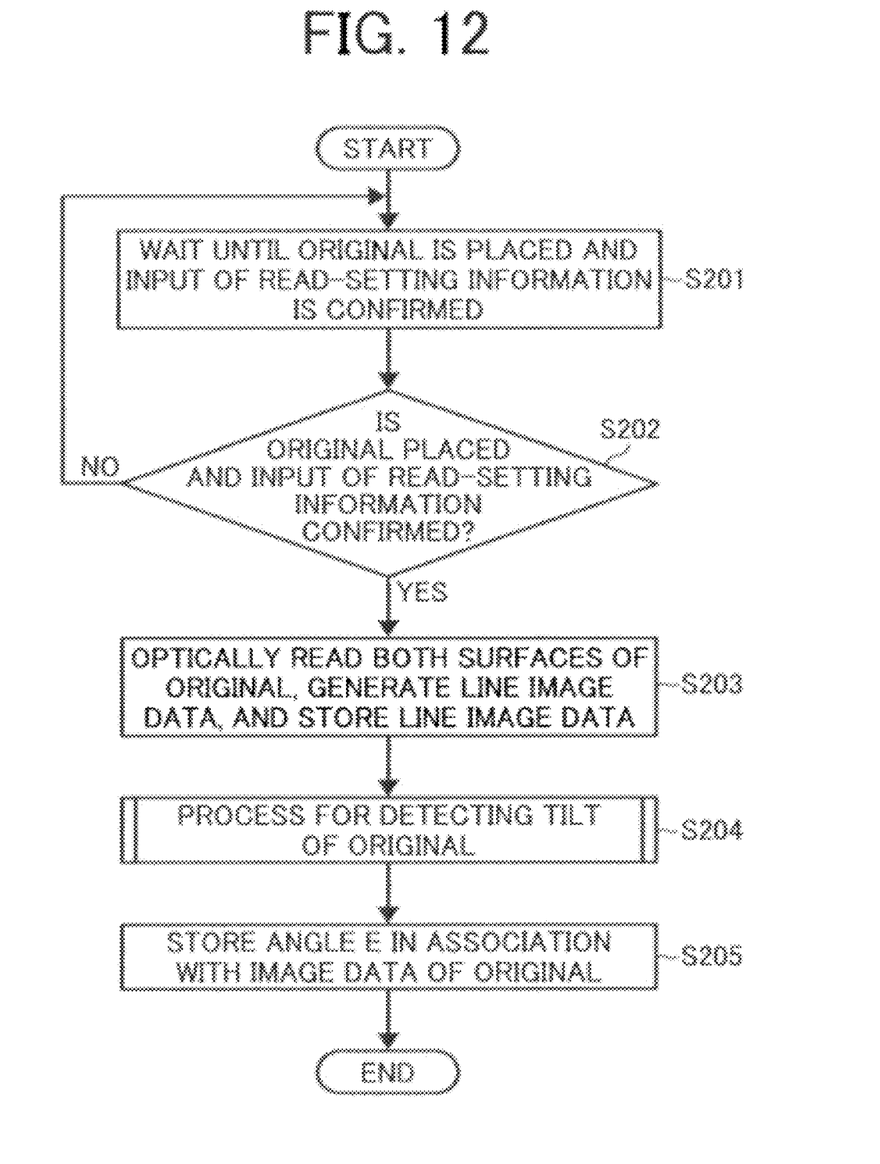
FIG. 12 is a flowchart of a process procedure of an image processing method performed by the image forming apparatus shown in FIG. 1.

FIG. 12 is a flowchart of a process procedure of an image processing method performed by the image processing apparatus 100. The reading unit 120 waits until an original is placed on a platen (not shown) and an input of the read-setting information is confirmed (Step S201 and NO at Step S202). When the original is placed on the reading unit 120 and the input of the read-setting information is confirmed via the operation unit 140 (YES at Step S202), the reading unit 120 causes the first line sensor 121 and the second line sensor 122 to optically read the front surface and the back surface of the original for each reading line, respectively, generates the front-surface line image data and the back-surface line image data, that is, the both-surfaces line image data, and stores the both-surfaces line image data in the RAM 150 (Step S203).

The tilt detecting unit 130 reads the both-surfaces line image data from the RAM 150 and detects the angle E indicating the tilt of the original through a process for detecting the tilt of the original (Step S204). The tilt detecting unit 130 stores the detected angle E in the storage unit 170 in association with the both-surfaces image data of the both surfaces of the original accumulated in the RAM 150 (Step S205).

Figure 13:
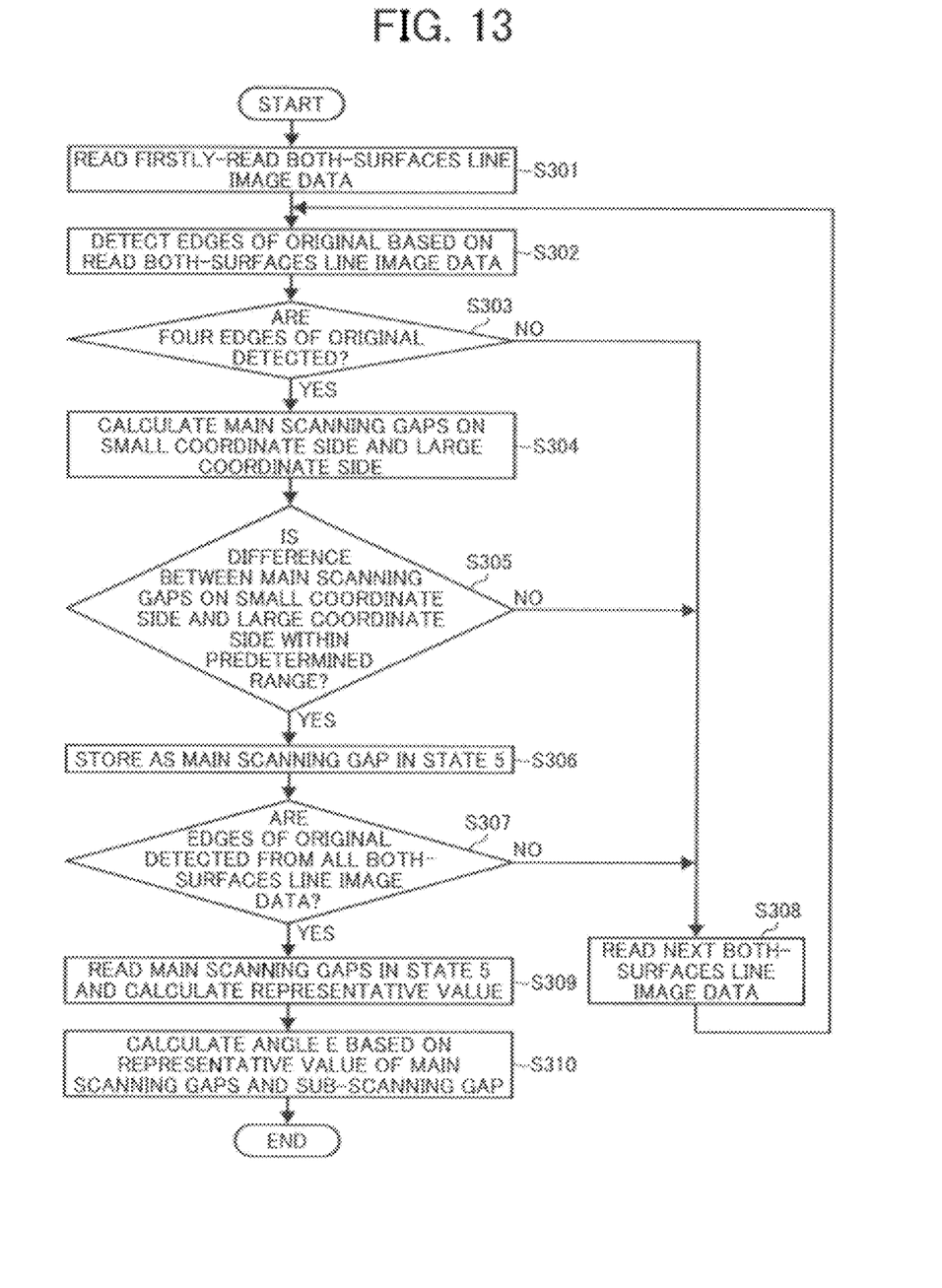
FIG. 13 is a flowchart of a process procedure for detecting a tilt of an original.

The process for detecting the tilt of the original (Step S204 in FIG. 12) is described below. FIG. 13 is a flowchart of a process procedure for detecting the tilt of the original. The tilt detecting unit 130 reads first front-surface line image data and first back-surface line image data that have been read at the same time, that is, the both-surfaces line image data (Step S301), and detects edges of the original from the read line image data (Step S302).

The tilt detecting unit 130 determines whether the four edges A, B, C, and D are detected from the front-surface line image data and the back-surface line image data (Step S303). When determining that the edges A, B, C, and D are not detected (NO at Step S303), process control proceeds to Step S308. On the other hand, when determining that the edges A, B, C, and D are detected (YES at Step S303), the tilt detecting unit 130 calculates the main-scanning coordinates xA, xB, xC, and xD of the edges A, B, C, and D, and calculates the main-scanning gap xA−xC on the small coordinate side and the main-scanning gap xB−xD on the large coordinate side (Step S304).

The tilt detecting unit 130 determines whether a difference between the main-scanning gap xA−xC on the small coordinate side and the main-scanning gap xB−xD on the large coordinate side is within a predetermined range (Step S305). When determining that the difference is not within the predetermined range (NO at Step S305), process control proceeds to Step S308. On the other hand, when determining that the difference is within the predetermined range (YES at Step S305), the tilt detecting unit 130 stores the main-scanning gaps xA–xC and xB–xD as the main-scanning gaps of the original in the state 5 in the RAM 150 (Step S306).

The tilt detecting unit 130 determines whether the edges of one original are detected from all the both-surfaces line image data of the original (Step S307). When determining that the edges are not detected from all the both-surfaces line image data (NO at Step S307), process control proceeds to Step S308. At Step S308, next front-surface line image data and next back-surface line image data that have been read at the same time are read from the RAM 150 and process control is repeated from Step S302.

When determining that the edges are detected from all the both-surfaces line image data (YES at Step S307), the tilt detecting unit 130 reads all the main-scanning gaps of the original in the state 5 from the RAM 150 and calculates a representative value of the main-scanning gaps (Step S309). Then, the tilt detecting unit 130 calculates the angle E based on the representative value of the main-scanning gaps and the sub-scanning gap (Step S310).

An image processing program implemented by the image processing apparatus 100 is described below. The image processing program is pre-stored in a computer-readable recording medium such as a CD-ROM, flexible disk (FD), CD-R, digital versatile disk (DVD) so that it can be read out from the recording medium.

The image processing program can be stored in computers connected to a network such as the Internet so that the image processing program can be downloaded via the network as appropriate. Furthermore, the image processing program can be provided and distributed via a network such as the Internet, or can be provided and distributed by being pre-stored in a ROM or the like.

The image processing program has a module configuration including the above units (the reading unit 120, the tilt detecting unit 130, and the operation unit 140). A central processing unit (CPU) that is a processor reads and executes, as hardware, the image processing program from the recording medium, so that the above units are loaded into a main memory and generated on the main memory.

A modified configuration is described below in which a user sends an image file that is obtained by causing the image processing apparatus 100 to read an original to an image file server via an internet protocol (IP) network.

Figure 14:
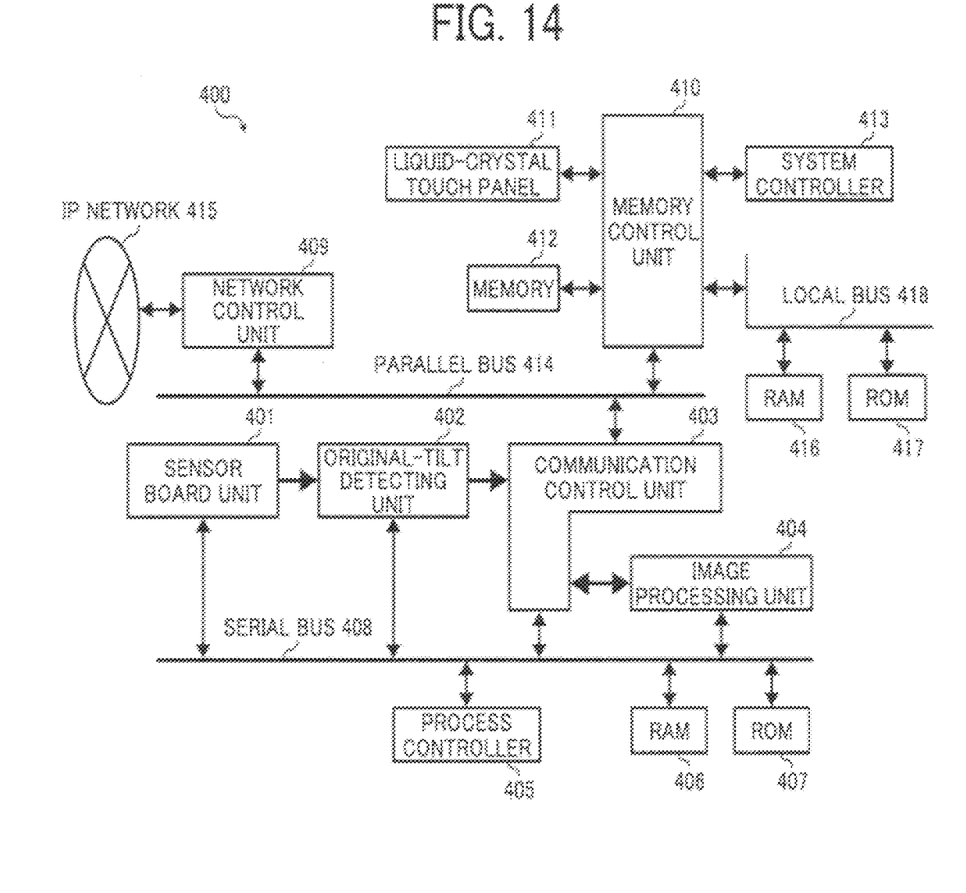
FIG. 14 is a block diagram of a modified configuration of the image forming apparatus shown in FIG. 1.

FIG. 14 is a block diagram of an image forming apparatus 400 that is modified from the image processing apparatus 100. The image forming apparatus 400 includes a sensor board unit 401, an original-tilt detecting unit 402, a communication control unit 403, an image processing unit 404, a process controller 405, a RAM 406, and a ROM 407, which are connected to one another via a serial bus 408. The communication control unit 403 is also connected to a parallel bus 414, so that the image forming apparatus 400 includes a network control unit 409 and a memory control unit 410, which are connected to the parallel bus 414.

The image forming apparatus 400 also includes a liquid-crystal touch panel 411, a memory 412, and a system controller 413, which are connected to the memory control unit 410. The memory control unit 410 is also connected to a local bus 418, so that the image forming apparatus 400 includes a RAM 416 and a ROM 417, which are connected to the local bus 418. The network control unit 409 is connected to an IP network 415 to which an apparatus (not shown) such as an external image file server is connected.

The sensor board unit 401 has the same function as that of the reading unit 120. The sensor board unit 401 generates the both-surfaces line image data and sends the both-surfaces line image data to the original-tilt detecting unit 402.

The original-tilt detecting unit 402 has the same function as that of the tilt detecting unit 130. The original-tilt detecting unit 402 detects a tilt of an original based on the both-surfaces line image data sent by the memory control unit 410, and sends the both-surfaces line image data to the communication control unit 403 without performing any processes on the both-surfaces line image data.

The communication control unit 403 controls data transmission and data reception among the sensor board unit 401, the original-tilt detecting unit 402, the communication control unit 403, the image processing unit 404, the memory control unit 410, and the network control unit 409. For example, the communication control unit 403 switches over a data path when performing a scan to memory operation or a memory to network operation, which will be described later.

The image processing unit 404 performs various image processing on image data. The image processing unit 404 can perform image processing for correcting the tilt of the original based on the tilt of the original detected by the original-tilt detecting unit 402. The image processing unit 404 can also perform optimization of a frequency characteristic or a tone characteristic of the image data based on the configuration of the image forming apparatus 400 or needs from a user. The image processing unit 404 sends the image data subjected to the image processing to the communication control unit 403.

The process controller 405 functions as a processor that controls operations of the sensor board unit 401, the original-tilt detecting unit 402, the communication control unit 403, and the image processing unit 404. For example, the process controller 405 performs settings necessary for the operations by the above units, instructs activation or termination of the above units, and monitors processes of various processing.

The RAM 406 connected to the serial bus 408 is a memory for storing therein information to be used for performing processes by the sensor board unit 401, the original-tilt detecting unit 402, the communication control unit 403, the image processing unit 404, and the process controller 405.

The ROM 407 connected to the serial bus 408 is a memory for storing therein control programs or master data to be used for performing processes by the sensor board unit 401, the original-tilt detecting unit 402, the communication control unit 403, the image processing unit 404, and the process controller 405.

The RAM 406 and the ROM 407 store therein characteristic values of a CCD or a CIS mounted on the sensor board unit 401 or parameters to be used for image processing performed by the image processing unit 404.

The network control unit 409 communicates with an external image file server connected to the IP network 415. When transmitting data, the network control unit 409 splits the data to be transmitted into packets based on a communication protocol of the IP network 415, and then outputs the packets to the IP network 415. When receiving data, the network control unit 409 recovers data before being split into packets from the packets based on the communication protocol of the IP network 415.

The memory control unit 410 compresses or expands image data, and reads or writes image data to or from the memory 412. The liquid-crystal touch panel 411 has the same function as that of the operation unit 140. The memory 412 is a memory for storing therein image data or the angle E indicating the tilt of the original.

The system controller 413 functions as a processor that controls operations of the memory control unit 410, the liquid-crystal touch panel 411, the memory 412, and the network control unit 409. For example, the process controller 405 performs settings necessary for the operations by the above units, instructs activation or termination of the above units, and monitors processes of various processing.

The RAM 416 connected to the memory control unit 410 via the local bus 418 is a memory for storing therein information to be used for processes performed by the network control unit 409, the memory control unit 410, the liquid-crystal touch panel 411, the memory 412, and the system controller 413.

The ROM 417 connected to the memory control unit 410 via the local bus 418 is a memory for storing therein control programs or master data to be used for performing processes by the network control unit 409, the memory control unit 410, the liquid-crystal touch panel 411, the memory 412, and the system controller 413.

The RAM 416 and the ROM 417 store therein protocol information to be used for receiving data by the network control unit 409 via the IP network 415, character information or bitmap information to be used for displaying characters or drawings on the liquid-crystal touch panel 411, information about the total amount of image data capable of being stored in the memory 412 or remaining space of the memory 412, or information input by a user via the liquid-crystal touch panel 411.

An operation performed by the image forming apparatus 400 is described below. Explanation about operations same as those performed by the image processing apparatus 100 is omitted.

A user allocates a storage location in an external image file server for storing therein an image file of an original to be read, and then records an IP address of the image file server and a path name of the storage location where the image file is to be stored in the memory 412.

The user places the original on a platen (not shown) of the image forming apparatus 400 and inputs the read-setting information via the liquid-crystal touch panel 411. The image forming apparatus 400 repeats the scan to memory operations as many times as the number of the originals placed on the platen, so that image data of the original is accumulated. The image forming apparatus 400 repeats the memory to network operations as many times as the number of image files to be transmitted, so that the image files are transmitted to the image file server. Upon receiving the image files, the image file server assigns a unique file name to each of the image files and stores the image files in the storage location allocated in advance by the user. The unique file name is a name for identifying each image file. Specifically, the unique name can be named after a time for receiving the image file. For example, when an image file in tagged image file format (TIFF) is stored at 12:25:40 on Oct. 1, 2010, the image file can be named as 20101001122540.TIFE when it is stored. After the image file is stored, an image of the image file can be viewed by using image viewing software of a personal computer or the like, or can be moved or copied to another information processing apparatus.

The scan to memory operation and the memory to network operation that are basic operations performed by the image forming apparatus 400 are described below.

The scan to memory operation is a series of operations for reading an original by the sensor board unit 401, generating both-surfaces line image data of the original, and storing the both-surfaces line image data in the memory 412. Specifically, when a user places an original on the platen, sets the read-setting information via the liquid-crystal touch panel 411 (see FIG. 3), and then presses the confirmation button, the set read-setting information is sent to the process controller 405 and the system controller 413.

The process controller 405 stores the received read-setting information in the RAM 406, and instructs the sensor board unit 401, the original-tilt detecting unit 402, the communication control unit 403, and the image processing unit 404 to perform operations based on the read-setting information.

The system controller 413 stores the received read-setting information in the RAM 416, and instructs the network control unit 409 and the memory control unit 410 to perform operations based on the read-setting information.

The sensor board unit 401 reads each of the front surface and the back surface of the original on the platen, generates the both-surfaces line image data, and sends the generated both-surfaces line image data to the original-tilt detecting unit 402.

The original-tilt detecting unit 402 performs a calculation operation for detecting a tilt of the original based on the both-surfaces line image data sent by the sensor board unit 401 while the original-tilt detecting unit 402 does not perform any processes on the both-surfaces line image data. The original-tilt detecting unit 402 sends the both-surfaces line image data to the image processing unit 404 via the communication control unit 403.

The image processing unit 404 performs image processing for compensating an optical characteristic of the sensor board unit 401, and sends the compensated both-surfaces line image data obtained after the image processing to the communication control unit 403.

The communication control unit 403 sends the compensated both-surfaces line image data sent by the image processing unit 404 to the memory control unit 410 via the parallel bus 414. The memory control unit 410 compresses the compensated both-surfaces line image data sent via the parallel bus 414 into a format that can be stored in the memory 412, and then stores the compressed compensated both-surfaces line image data in the memory 412.

During the scan to memory operation, the process controller 405 is kept notified of statuses of the sensor board unit 401, the original-tilt detecting unit 402, the communication control unit 403, and the image processing unit 404, while the system controller 413 is kept notified of statuses of the memory control unit 410 and the memory 412. When accumulation of the compressed compensated both-surfaces line image data in the memory 412 is completed and then the accumulated compressed compensated both-surfaces line image data is stored as image data for both surfaces of the original, the process controller 405 displays a notification about the completion on the liquid-crystal touch panel 411, and ends the scan to memory operation.

The memory to network operation is a series of operations for sending the image data of the both surfaces of the original stored in the memory 412 to the external image file server or the like.

Specifically, the memory control unit 410 reads the image data of the both surfaces of the original from the memory 412, expands the image data into an image format before compression, and sends the expanded image data of the both surfaces of the original to the communication control unit 403 via the parallel bus 414. The communication control unit 403 sends the image data of the both surfaces of the original sent via the parallel bus 414 to the image processing unit 404. The image processing unit 404 performs image processing for optimizing a frequency characteristic or a tone characteristic of the image data of the both surfaces of the original.

The image data of the both surfaces of the original that has been subjected to the image processing by the image processing unit 404 is sent to the communication control unit 403. The communication control unit 403 sends the received image data of the both surfaces of the original to the network control unit 409 via the parallel bus 414.

The network control unit 409 converts a format of the image data of the both surfaces of the original into a universal file format such as a TIFF or a joint photographic expert group (JPEG), and generates a transmission image file.

The network control unit 409 transmits the transmission image file to the image file server that is a transmission destination based on the communication protocol of the IP network 415. During the memory to network operation, the system controller 413 is kept notified of the statuses of the memory control unit 410, the memory 412, and the network control unit 409. When the network control unit 409 completes the transmission of the transmission image file, the system controller 413 displays a notification about the completion on the liquid-crystal touch panel 411, and ends the memory to network operation.

The scan to memory operation and the memory to network operation need not be performed alternately. For example, when the IP network 415 is busy, it is applicable to perform only the scan to memory operation at first. In this case, regardless of the busy state of the IP network 415, an original can be read at a stable speed. Furthermore, because one image file may store therein data of a plurality of originals as in the case of a multi TIFF, the number of times of the scan to memory operations to be performed and the number of times of the memory to network operations to be performed are not always the same. In this case, it is preferable to manage the operations by the system controller 413.

The constituent elements of the apparatuses shown in the drawings are based on functional concepts. The constituent elements do not necessarily have to be physically arranged in the way shown in the drawings. A part or all of the apparatuses can be distributed or integrated, either functionally or physically in any arbitrary units according to various loads and use condition. The process procedures can be modified according to the distribution or integration of the constituent elements.

According to one aspect of the present invention, a sensor to be used only for detecting a tilt need not be provided. Therefore, a size of an image processing apparatus can be reduced and costs for hardware can be suppressed.

Furthermore, according to another aspect of the present invention, a large-scale circuit used for a complicated calculation process or an image recognition process is not necessary. Therefore, a tilt of an original can be detected in a shorter time than a time taken with the conventional technology. Furthermore, a tilt can be detected more precisely by increasing the distance between two line sensors.

Moreover, according to still another aspect of the present invention, a tilt can be more precisely detected by increasing a temporal interval between a plurality of reading times.

Furthermore, according to still another aspect of the present invention, special software is not necessary, a calculation can be performed in a short time, and only a small-scale circuit is sufficient as hardware.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a first line sensor that is arranged in a main-scanning direction and optically reads a first surface of an original, to obtain first line image data;
   a second line sensor that is arranged in parallel to the first line sensor at a predetermined distance and optically reads a second surface of the original, to obtain second line image data; and
   a tilt detecting unit that detects a first main-scanning coordinate of a first edge and a second main-scanning coordinate of a second edge from the first line image data, detects a third main-scanning coordinate of a third edge and a fourth main-scanning coordinate of a fourth edge from the second line image data, and detects a tilt of the original with respect to a sub-scanning direction based on detected main-scanning coordinates, wherein
   the tilt detecting unit calculates a first value by subtracting the third main-scanning coordinate from the first main-scanning coordinate and a second value by subtracting the fourth main-scanning coordinate from the second main-scanning coordinate, and when a difference between the first value and the second value is within a predetermined range, detects the tilt based on the first value, the second value, and the predetermined distance,
   the first line sensor obtains a plurality of pieces of the first line image data at a plurality of reading times,
   the second line sensor obtains a plurality of pieces of the second line image data at a plurality of reading times, and
   the tilt detecting unit calculates the first value for all the pieces of the first line image data, calculates the second value for all the pieces of the second line image data, calculates a representative value of pairs of first values and second values that have differences within the predetermined range among calculated first values and second values, and detects the tilt based on the representative value and the predetermined distance.

2. The image processing apparatus according to claim 1, wherein the representative value is an average value.

3. The image processing apparatus according to claim 1, wherein the representative value is calculated by a least-square approximation.

4. An image processing method comprising:
   first reading including a first line sensor arranged in a main-scanning direction optically reading a first surface of an original to obtain first line image data;
   second reading including a second line sensor arranged in parallel to the first line sensor at a predetermined distance optically reading a second surface of the original to obtain second line image data; and
   tilt detecting including
      detecting a first main-scanning coordinate of a first edge and a second main-scanning coordinate of a second edge from the first line image data,
      detecting a third main-scanning coordinate of a third edge and a fourth main-scanning coordinate of a fourth edge from the second line image data, and
      detecting a tilt of the original with respect to a sub-scanning direction based on detected main-scanning coordinates, wherein
   the tilt detecting further includes calculating a first value by subtracting the third main-scanning coordinate from the first main-scanning coordinate and a second value by subtracting the fourth main-scanning coordinate from the second main-scanning coordinate, and when a difference between the first value and the second value is within a predetermined range, detecting the tilt based on the first value, the second value, and the predetermined distance, the first reading further includes the first line sensor obtaining a plurality of pieces of the first line image data at a plurality of reading times, the second reading further includes the second line sensor obtaining a plurality of pieces of the second line image data at a plurality of reading times, and the tilt detecting further includes calculating the first value for all the pieces of the first line image data, calculates the second value for all the pieces of the second line image data, calculating a representative value of pairs of first values and second values that have differences within the predetermined range among calculated first values and second values, and detecting the tilt based on the representative value and the predetermined distance.

5. The image processing method according to claim 4, wherein the representative value is an average value.

6. The image processing method according to claim 4, wherein the representative value is calculated by a least-square approximation.

7. A non-transitory computer program product comprising a computer usable medium having computer readable program codes embodied in the medium that when executed causing a computer to execute:

first reading including a first line sensor arranged in a main-scanning direction optically reading a first surface of an original to obtain first line image data;

second reading including a second line sensor arranged in parallel to the first line sensor at a predetermined distance optically reading a second surface of the original to obtain second line image data; and tilt detecting including detecting a first main-scanning coordinate of a first edge and a second main-scanning coordinate of a second edge from the first line image data, detecting a third main-scanning coordinate of a third edge and a fourth main-scanning coordinate of a fourth edge from the second line image data, and detecting a tilt of the original with respect to a sub-scanning direction based on detected main-scanning coordinates, wherein the tilt detecting further includes calculating a first value by subtracting the third main-scanning coordinate from the first main-scanning coordinate and a second value by subtracting the fourth main-scanning coordinate from the second main-scanning coordinate, and when a difference between the first value and the second value is within a predetermined range, detecting the tilt based on the first value, the second value, and the predetermined distance, the first reading further includes the first line sensor obtaining a plurality of pieces of the first line image data at a plurality of reading times, the second reading further includes the second line sensor obtaining a plurality of pieces of the second line image data at a plurality of reading times, and the tilt detecting further includes calculating the first value for all the pieces of the first line image data, calculates the second value for all the pieces of the second line image data, calculating a representative value of pairs of first values and second values that have differences within the predetermined range among calculated first values and second values, and detecting the tilt based on the representative value and the predetermined distance.

8. The computer program product according to claim 7, wherein the representative value is an average value.

9. The computer program product according to claim 7, wherein the representative value is calculated by a least-square approximation.

* * * * *